(12) United States Patent
McClure

(10) Patent No.: US 6,935,094 B1
(45) Date of Patent: Aug. 30, 2005

(54) WIND GUARD LATCH RETAINER

(75) Inventor: John R. McClure, New Holland, PA (US)

(73) Assignee: CNH America LLC, New Holland, PA (US)

( * ) Notice: Subject to any disclaimer, the term of this patent is extended or adjusted under 35 U.S.C. 154(b) by 82 days.

(21) Appl. No.: 10/824,803

(22) Filed: Apr. 15, 2004

(51) Int. Cl.[7] ............................................. A01D 43/00
(52) U.S. Cl. ....................................................... 56/190
(58) Field of Search ........................... 56/190, 341, 364

(56) References Cited

U.S. PATENT DOCUMENTS

| | | | | |
|---|---|---|---|---|
| 2,391,763 A | | 12/1945 | Anderson ..................... 56/351 |
| 2,524,233 A | * | 10/1950 | Russell ........................ 56/364 |
| 2,691,266 A | * | 10/1954 | Meyer et al. ................. 56/364 |
| 2,703,957 A | * | 3/1955 | Russell ........................ 56/364 |
| 2,713,762 A | | 7/1955 | Clausen ....................... 56/364 |
| 2,872,772 A | | 2/1959 | Nolt ............................. 56/364 |
| 3,924,391 A | * | 12/1975 | Cheatum ..................... 56/364 |
| 4,411,127 A | | 10/1983 | Diederich, Jr. ............... 56/364 |
| 4,516,389 A | | 5/1985 | Core ............................ 56/341 |
| 4,524,576 A | * | 6/1985 | Probst ......................... 56/372 |
| 6,295,797 B1 | * | 10/2001 | Naaktgeboren et al. ....... 56/364 |
| 6,314,709 B1 | * | 11/2001 | McClure et al. .............. 56/364 |
| 6,688,092 B2 | * | 2/2004 | Anstey et al. ................ 56/220 |

FOREIGN PATENT DOCUMENTS

EP  1348330 A1 * 10/2003  .......... A01D/89/00

\* cited by examiner

*Primary Examiner*—Árpád Fábián Kovács
(74) *Attorney, Agent, or Firm*—John William Stader; Collin A. Webb

(57) ABSTRACT

A latch retainer mechanism for securely holding the windrow pipe of an agricultural crop pickup.

4 Claims, 4 Drawing Sheets

WIND GUARD LATCH RETAINER

BACKGROUND OF THE INVENTION

The present invention relates generally to hay balers, and more particularly to improved mechanism for retaining the latch on the wind guard of an agricultural crop pickup on a round baler.

For many years agricultural balers have been used to consolidate and package crop material so as to facilitate the storage and handling of the crop material for later use. Usually, a mower-conditioner cuts and conditions the crop material for windrow drying in the sun. When the cut crop material is properly dried, a baler is pulled along the windrows to pick up the crop material and form it into conveniently sized and shaped round bales. More specifically, the windrow pickup of the baler gathers the cut and windrowed crop material and lifts it into the baling chamber. In a round baler, the baling chamber consists of a pair of opposing sidewalls with a series of belts that rotate and compress the crop material into a cylindrical shape. When the bale has achieved a desired size and density, the operator wraps the bale to ensure that the bale maintains its shape and density. The operator then raises the tailgate of the baler and ejects the bale onto the ground. The tailgate is then closed and the cycle repeated as necessary and desired to manage the field of cut crop material.

It has been customary to provide the pickup mechanism with wind guards which hold down the hay or other crop material as it is being fed rearwardly to prevent the crop material from being blown off the pickup floor. Such guards also serve to channel the crop material to the feed means, the crop material having to pass through the space between the pickup floor and the wind guards. Typical wind guards are shown in U.S. Pat. Nos. 2,713,762; 2,872,772 and 4,411,127.

Conventional wind guards are fairly simple structures, and include an elongated pipe-like member, often referred to as a wind guard pipe, extending across the front of the pickup mechanism with a plurality of tines attached to the wind guard pipe along its length extending rearwardly over the pickup mechanism. This type of wind guard may be manually adjusted for different sizes of windrows of crop material by positioning the wind guard pipe and the tines closer to the pickup mechanism for small windrows or farther away from the pickup mechanism for large windrows. If the wind guard is adjusted for small windrows and a large windrow is encountered, the wind guard pipe and tines may be too close to the pickup mechanism to accommodate the large windrow. This could cause plugging of the pickup mechanism. If the wind guard is adjusted for large windrows and a small windrow is encountered, the wind guard tines may be too far away from the pickup mechanism to protect the small windrow. This could result in wind loss of crop material.

Most pickups employ a pair of support links pivotably affixed at the rear of the pickup assembly and extending forwardly toward the front of the pickup assembly. The forward ends of these support links have a U-shaped to receive the wind guard pipe adjacent opposing ends thereof—though an upwardly open slot would work also. A relatively short latch is pivotably affixed near the forward end of each support link, one latch per support link, and has a semicircular cutout such that each latch may be rotated to partially encircle the windrow pipe while it is engaged with the U-shaped end of the respective support link, holding it in an operative position. A spring mechanism at the pivot point of each latch creates friction between each support link and respective latch to maintain closure.

It has been found that crop material being picked up and fed between the pickup floor and the wind guard engages the forward ends of the support links and respective latches, and on occasion overcomes the friction holding the wind guard pipe in position. Thus, the wind guard pipe may come loose and become ineffectual.

It would improve the operation of agricultural crop pickups if the problems identified above could be overcome.

SUMMARY OF THE INVENTION

Accordingly, it is an object of the present invention is to provide an improved attachment mechanism for the windrow pipe of an agricultural pickup.

Another object of the present invention is to provide an improved latch mechanism for the windrow pipe of an agricultural pickup that ensures proper operation and eliminates unwanted disengagement of the windrow pipe during operation.

It is another object of the instant invention to provide a mechanism for positive latching of the windrow pipe of a round baler pickup.

It is another object of the instant invention to provide a retainer for the latch mechanism of the wind guard pipe on the floating wind guard of an agricultural crop pickup.

It is yet another object of this invention to provide an improved latching mechanism for the wind guard pipe of an agricultural crop pickup that is durable in construction, inexpensive of manufacture, carefree of maintenance, facile in assemblage, and simple, versatile and effective in use.

These and other objects are attained by providing a latching mechanism for securely holding the windrow pipe of an agricultural crop pickup.

DESCRIPTION OF THE DRAWINGS

The advantages of this invention will be apparent upon consideration of the following detailed disclosure of the invention, especially when taken in conjunction with the accompanying drawings wherein.

DESCRIPTION OF THE PREFERRED EMBODIMENT

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "left" or "right" are used as a matter of mere convenience, and are determined by standing at the rear of the machine facing in its normal direction of travel. Furthermore, the various components shown or described herein for any specific application of this invention can be varied or altered as anticipated by this invention and the practice of a specific application of any element may already by widely known or used in the art by persons skilled in the art and each will likewise not therefore be discussed in significant detail.

Figure 1:
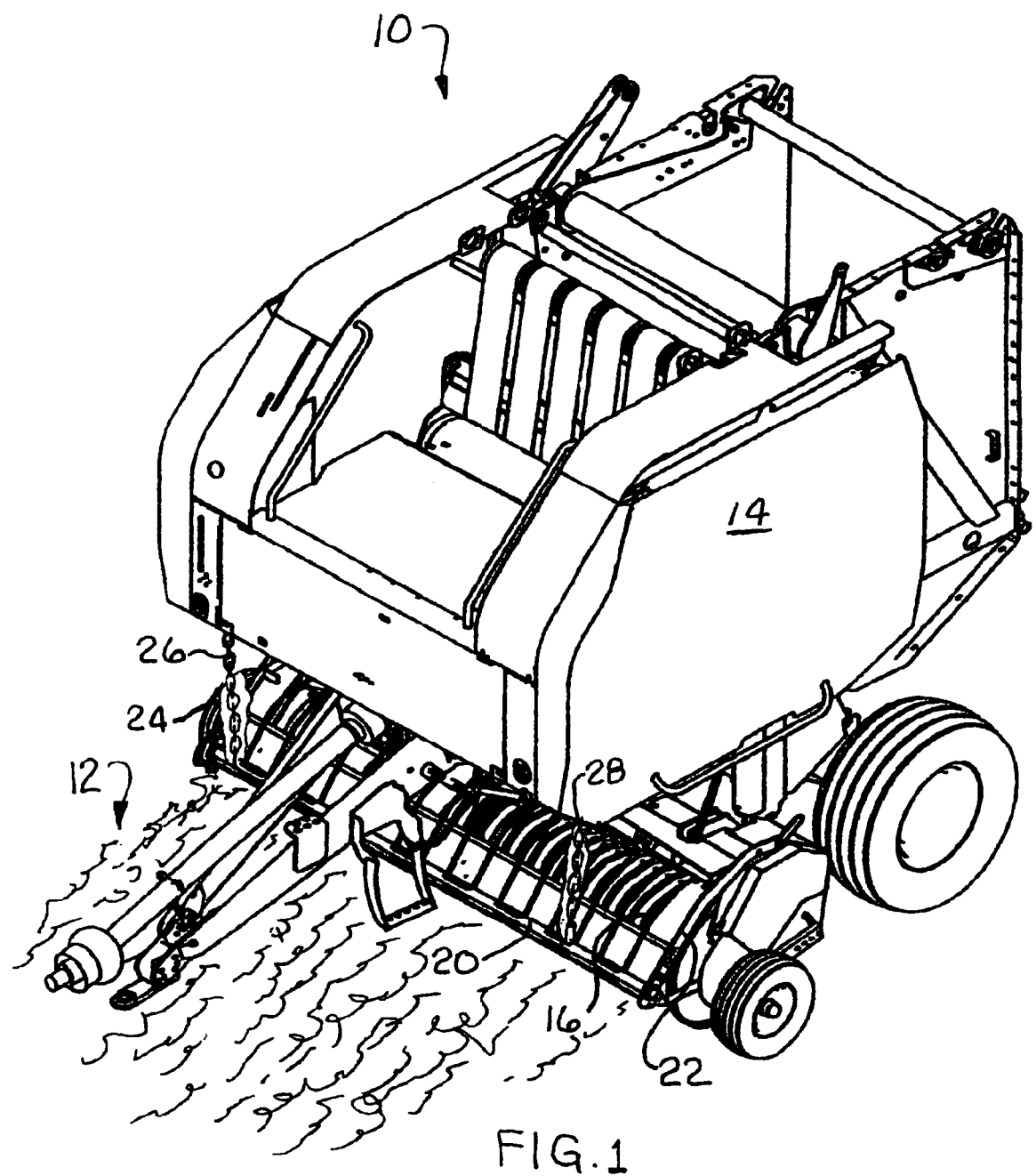
FIG. 1 is a front perspective view of a round baler of the type with which the invention may be used.

FIG. 1 shows an agricultural round baler 10 being pulled along a windrow of cut crop material 12 by a tractor T. Baler 10 is comprised of a wheel-supported bale-forming mechanism 14 with a crop pickup 16 for moving the crop material 12 from the field into the bale-forming mechanism 14.

A wind guard pipe 20 is seen in FIG. 1 as an elongate pipe-like member pivotably supported adjacent opposing ends by support links 22, 24. The rearward ends of the support links are pivotably affixed to the pickup 16, and the wind guard pipe is supported by a pair of chains 26, 28 fixed to the bale-forming mechanism. A plurality of tines 30 are affixed to wind guard pipe 20, extending rearwardly above the rotating pickup and thereby defining the path along which the cut crop material is directed. In operation, the initial setting of the wind guard is established by chains 26, 28. The amount of swing of tines 30 on wind guard pipe 20 is, in known manner, adjusted via limiting bracket 32 (see FIGS. 3A and 3B and U.S. Pat. No. 4,411,127).

Figure 2A:
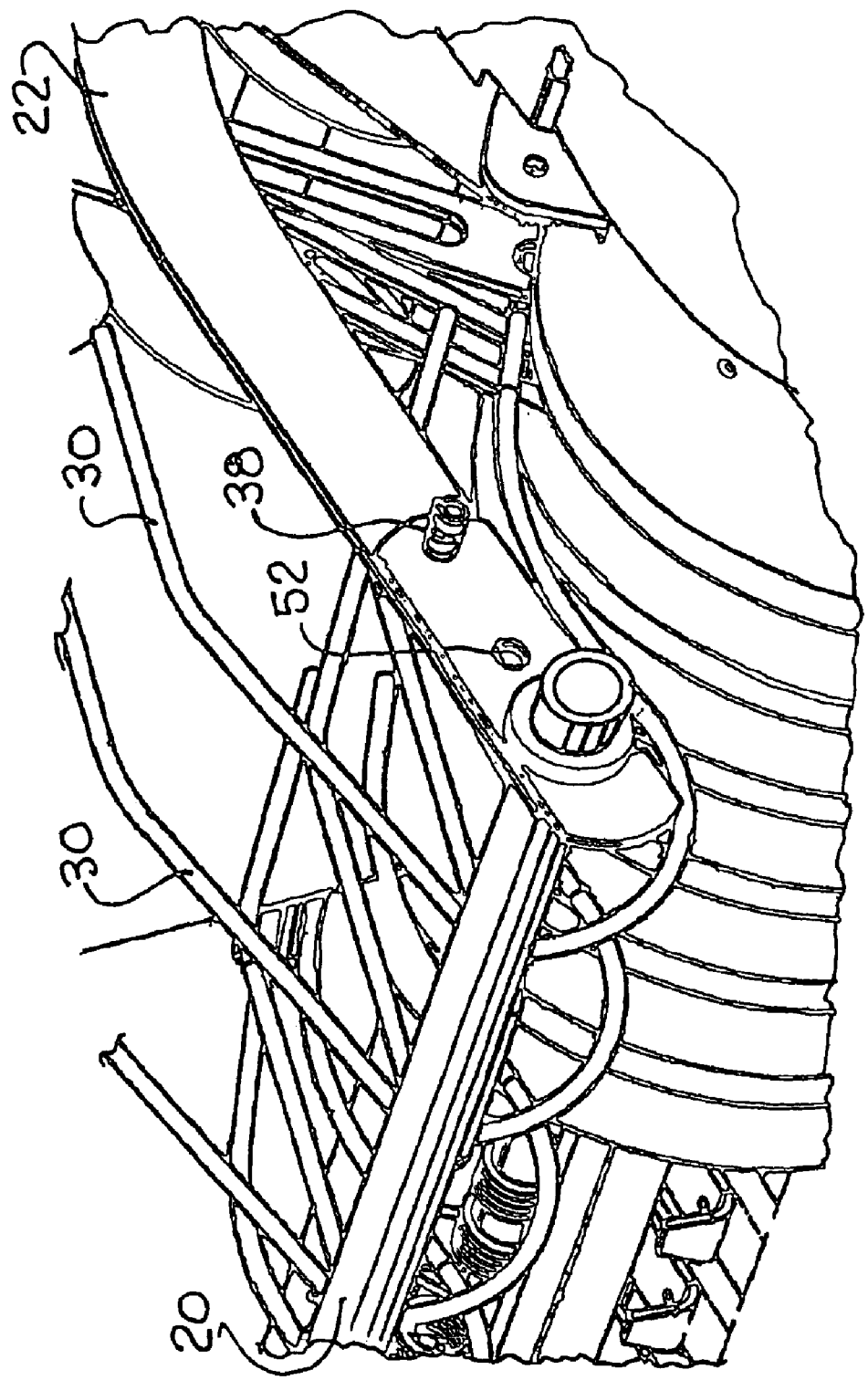
FIG. 2A is a partial perspective, showing many of the components that make up the left end of the wind guard pipe support and latching mechanism.
Figure 2B:
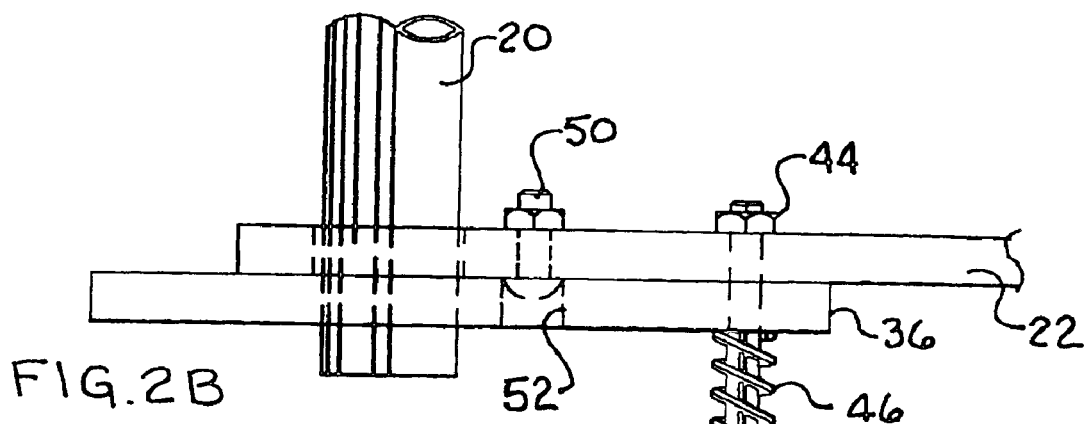
FIG. 2B is a partial top plan view of the wind guard pipe support and latching mechanism of FIG. 2A.
Figure 2C:
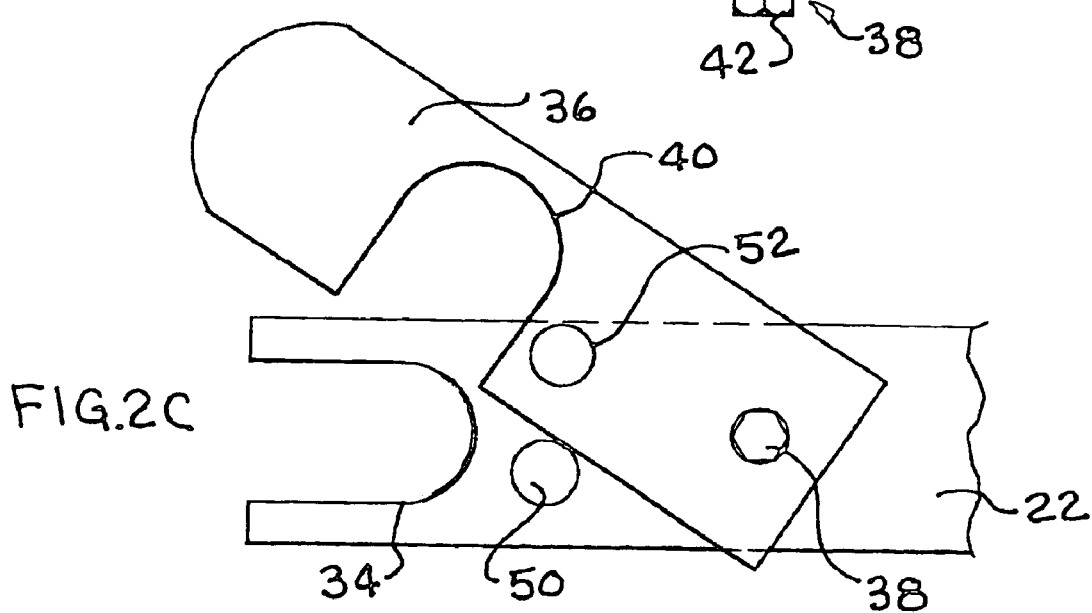
FIG. 2C is a partial left end plan view of the forward end of the left end of the wind guard pipe support, and the latching mechanism of the instant invention.

Referring now to FIGS. 2A, 2B and 2C, the left end of the wind guard pipe latching mechanism of the instant invention can be seen. Support link 22 terminates forwardly in an open U-shaped slot 34 (FIG. 2C) into which wind guard pipe 20 is inserted. Latch plate 36 is pivotably affixed to support link 22 by spring bolt 38. The latch plate has a semi-circular cutout 40 that, when pivoted to the latched position, partially encompasses wind guard pipe 20 and holds it within slot 34. Spring bolt 38 is comprised of an elongate bolt 42 extending through a compression spring 46, support link 22 and latch plate 36, with a nut 44 on the threaded end thereof holding the components together.

A carriage bolt 50, with a round head, is affixed to support link 22, with the round head on the side adjacent latch plate 36. Latch plate 36 has a hole 52 therethrough in alignment with the round head of bolt 50 such that, when pivoted to the latched position, the round head engages hole 52. The compression generated by spring 46 is adjusted such that the latch plate is "locked" in the latched position until the compression is overcome intentionally by the operator or repairman.

Figure 3B:
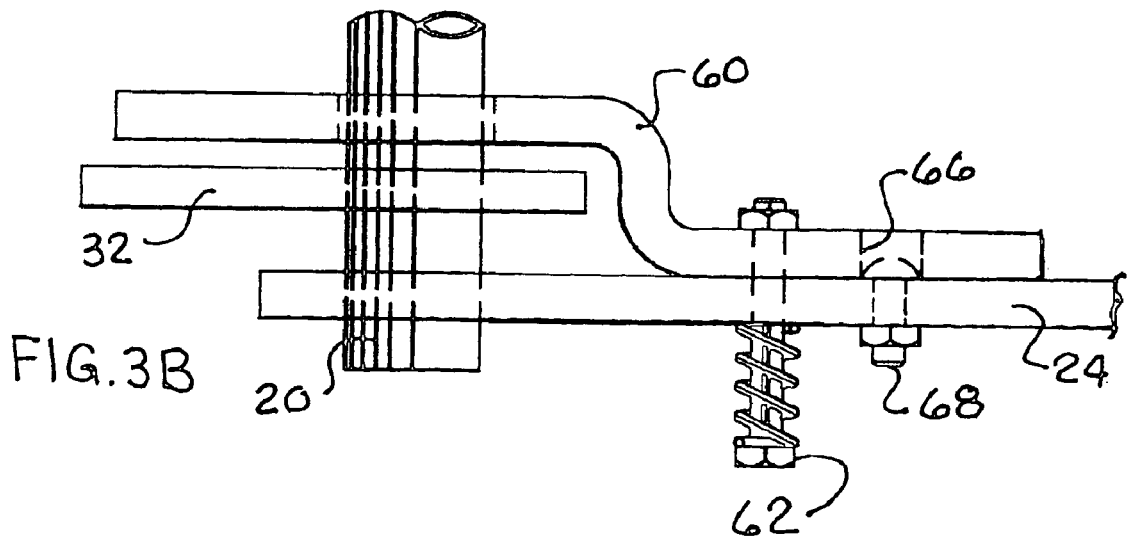
FIG. 3B is a partial top plan view of the wind guard pipe support and latching mechanism of FIG. 3A.
Figure 3A:
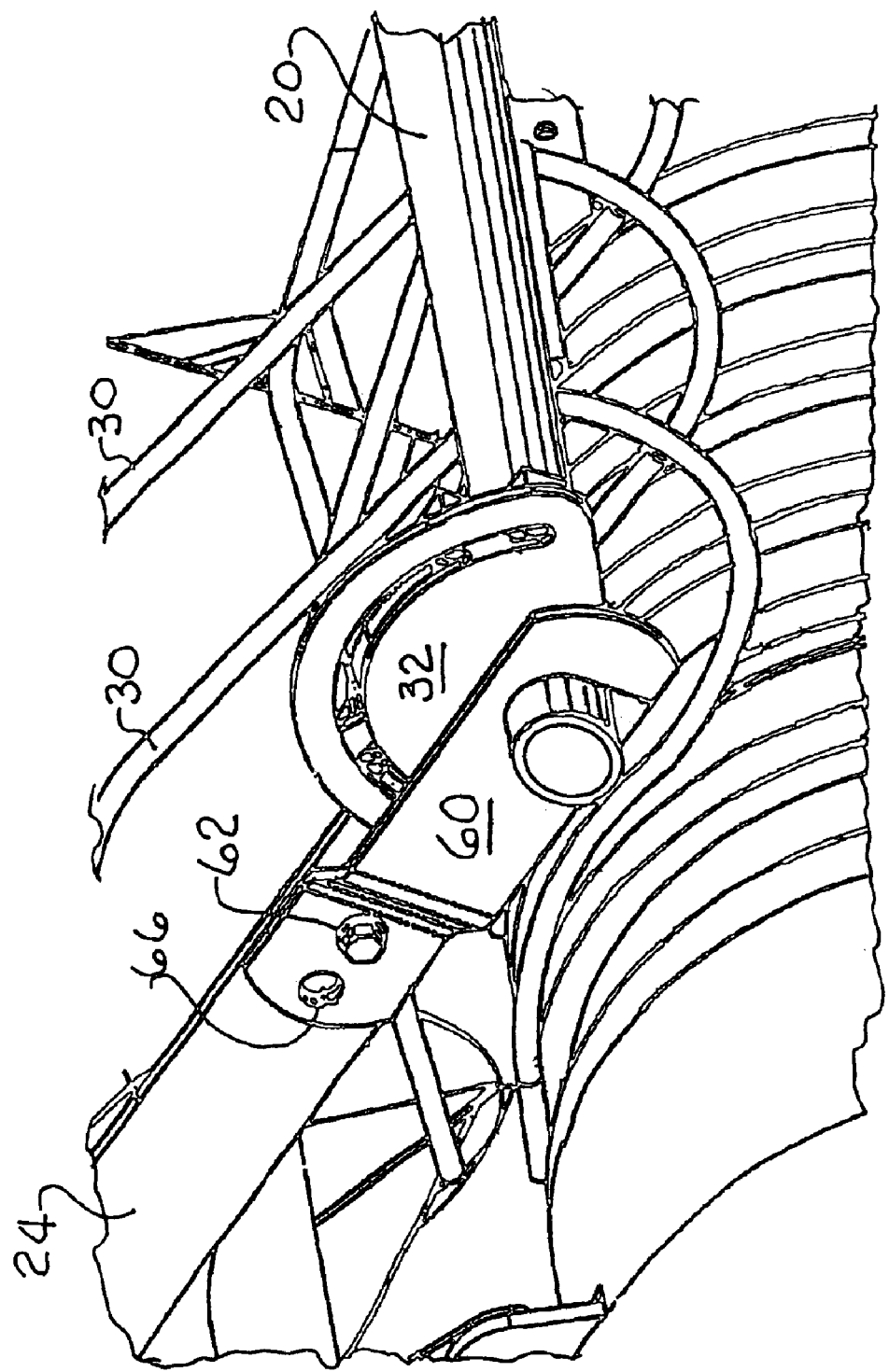
FIG. 3A is a partial perspective, showing many of the components that make up the right end of the wind guard pipe support and latching mechanism.

The latching mechanism for the right end of the wind guard pipe is slightly different due to the need to accommodate limiting bracket 32. Referring to FIGS. 3A and 3B, it can be that a bent latch plate 60 is pivotably affixed to support link 24 by a spring bolt 62 which is a duplicate of spring bolt 38. Bent latch plate 60 is formed such that it may accommodate the limiting bracket 32, yet still partially enclose the wind guard pipe 20 when in the latched position. Latch plate 60 also contains a semi-circular cutout, like that in latch plate 36 (not shown in profile, but shown in dotted line if FIG. 3B). In a manner similar to that discussed above with regard to latch plate 36, bent latch plate 60 has a hole 66 therethrough in line with the rounded head of carriage bolt 68.

In operation, the rounded head of the carriage bolt, when engaged with the hole through the latch plate, serves as a retainer, i.e., a latch retainer. This retainer prevents the latch from inadvertently moving to the unlatch position and releasing the wind guard pipe to move about freely and interrupt the normal operation of the pickup 16. While a carriage bolt with a rounded head is described in the preferred mode, other similarly shaped protrusions could be used with success. Also, instead of a hole through the latch plate, some type of indentation or a partial hold would work as well.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the inventions. Accordingly, the following claims are intended to protect the invention broadly as well as in the specific form shown.

Having thus described the invention, what is claimed is:

1. A wind guard for use on a pickup mechanism attachable to the frame of a crop harvesting machine, said wind guard comprising:

an elongate wind guard pipe extending transversely of said pickup mechanism;

a plurality of tines attached to said wind guard pipe along the length thereof;

said wind guard pipe being movable in a first direction upwardly and away from said pickup mechanism and in a second direction downwardly and toward said pickup mechanism during operation of said pickup mechanism;

first and second support links supporting said wind guard pipe, each having first and second opposing ends, said first ends of said support links pivotably affixed to said pickup mechanism;

said second ends of said first and second support links each having an open U-shaped slot therein into which said wind guard pipe is fitted;

a first latch plate having a semi-circular cutout therein of a diameter sufficient to partially enclose said wind guard pipe, said first latch plate pivotably affixed to said first support link adjacent said U-shaped slot therein and movable between a latched position where said cutout partially encloses said wind guard pipe and an unlatched position where said cutout does not partially enclose said wind guard pipe; and a latch retainer interconnectable between each said respective latch plate and support link to prevent inadvertent movement of said first and second latch plates to the unlatched position.

2. The wind guard of claim 1, wherein: said first and second latch plates are pivotably affixed to said respective first and second support links by spring bolts.

3. The wind guard of claim 2, wherein:

each said latch retainer includes a hole through the respective latch plate and a carriage bolt affixed through the respective support link, the rounded head of the carriage bolt positioned to engage said hole through the respective latch plate when the respective latch plate is in said latched position.

4. The wind guard of claim 3, wherein:

said support links are positioned such that the respective first ends thereof are adjacent the ends of said wind guard pipe.

\* \* \* \* \*